May 22, 1945.　　　K. F. RIESE　　　2,376,622
INCENSE VAPORIZER
Filed July 31, 1940　　　2 Sheets-Sheet 1
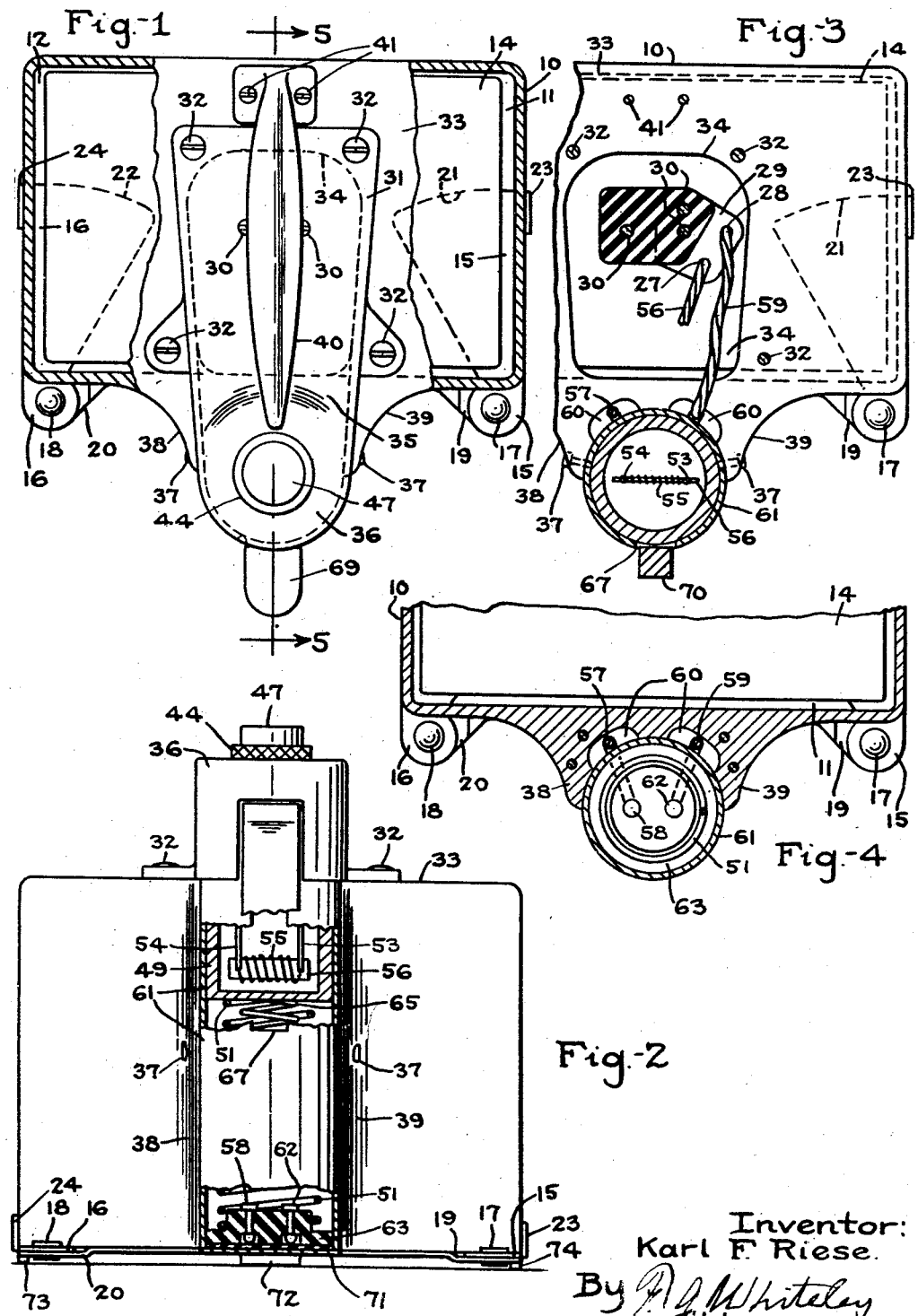
Inventor:
Karl F. Riese.
By R. L. Whiteley
Attorney.

May 22, 1945.  K. F. RIESE  2,376,622
INCENSE VAPORIZER
Filed July 31, 1940   2 Sheets-Sheet 2

Inventor:
Karl F. Riese.
By *A. J. Whiteley*
Attorney.

Patented May 22, 1945

2,376,622

UNITED STATES PATENT OFFICE 2,376,622

INCENSE VAPORIZER

Karl F. Riese, Minneapolis, Minn., assignor, by mesne assignments, to Margaret L. Williams, Minneapolis, Minn.

Application July 31, 1940, Serial No. 348,946

2 Claims. (Cl. 21—119)

My invention relates to an incense vaporizer of the type disclosed in the application of Carter and Whiteley, Serial No. 293,960, filed September 8, 1939, which has matured into Patent No. 2,228,505, and has for its object to provide a self-contained unit embodying means for receiving a dry cell battery and effecting connection therewith of certain circuits adapted to be closed for the production of the incense vapor as hereinafter described.

For producing incense vapor it is particularly desirable to have an apparatus which may be moved from place to place and in which the necessary electric current will always be available; at the same time the apparatus should not be too heavy, should be convenient to handle, should be attractive in form, simple and easy to operate and adapted to be stable in position when resting upon a table or a floor or any desirable point.

It is a primary object of my invention therefore, to provide a casing adapted to receive a dry cell battery and make contacts with the wiring system in said casing in combination with means for closing the circuit from the battery at desired times whereby a heating element or elements put into said circuit with the dry cell battery, will cause development of incense vapor, which may be expelled from the system at the point where it is desired to have the incense odor, either for the purpose of overriding unpleasant odors, as in a bathroom or kitchen, or for the purpose of giving a pleasantly scented atmosphere for breathing, as in a living room or boudoir.

It is a further object of my invention to so construct a casing and the chamber adapted to receive a dry cell battery in relation to contact posts in the chamber that the act of inserting the dry cell battery within the chamber will cause the proper contacts with the battery to be made, together with means to conveniently and easily hold the battery in position after it is inserted and adapted to be easily removed therefrom for renewal.

It is a further object of my invention to provide in association with the aforesaid casing an elongated vertical chamber, which may be circular in cross section or of any desired cross sectional shape, in which is mounted a container normally held in an erected position sealing against a cap member and wherein a resistance wire is held stationary in an open electric circuit and immersed in the incense liquid within the container, together with means for depressing the container to cause the resistance wire to be withdrawn from the liquid and for effecting a closing of the circuit when the container has been so depressed.

It is a further object of my invention to provide contacts in the bottom of said elongated chamber and to provide a switch closing member carried by the bottom of the removable container and insulated therefrom, said switch closure being spring supported so that when the incense container is drawn down to its lowered position the switch closure will be brought upon the contacts with a yielding pressure to close the otherwise open circuit.

The full objects and advantages of my invention appear in connection with the detailed description thereof and the novel features by which the advantageous results above defined are obtained, will be particularly pointed out in the claims.

In the drawings illustrating an application of my invention in one form:

Fig. 1 is a plan view with some parts broken away and in section of my incense vaporizer.

Fig. 2 is a front elevation view of the incense vaporizer with some parts broken away and in section.

Fig. 3 is a sectional plan view taken on line 3—3 of Fig. 5.

Fig. 4 is a sectional plan view taken on line 4—4 of Fig. 5.

Figure 5:
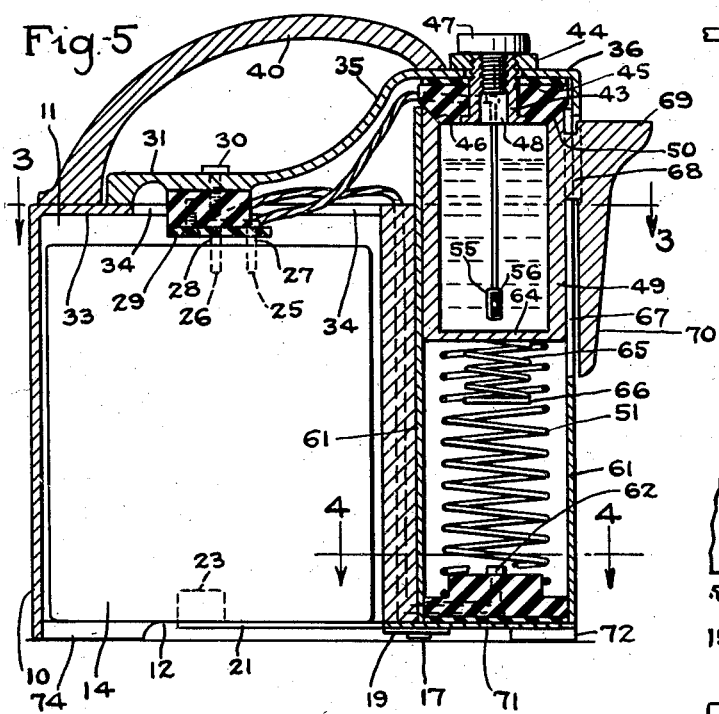
Fig. 5 is a sectional elevation view taken on line 5—5 of Fig. 1.
Figure 7:
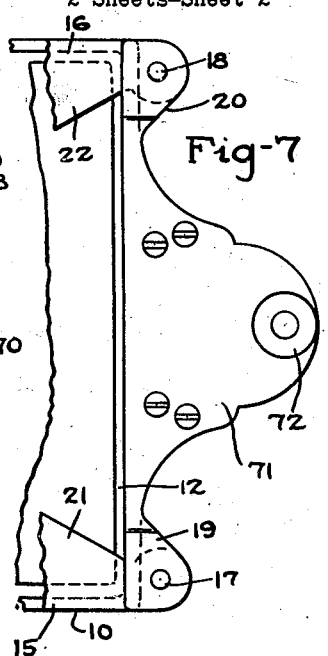
Fig. 7 is a fragmentary plan view of a part of the bottom of the apparatus viewed upwardly.
Figure 6:
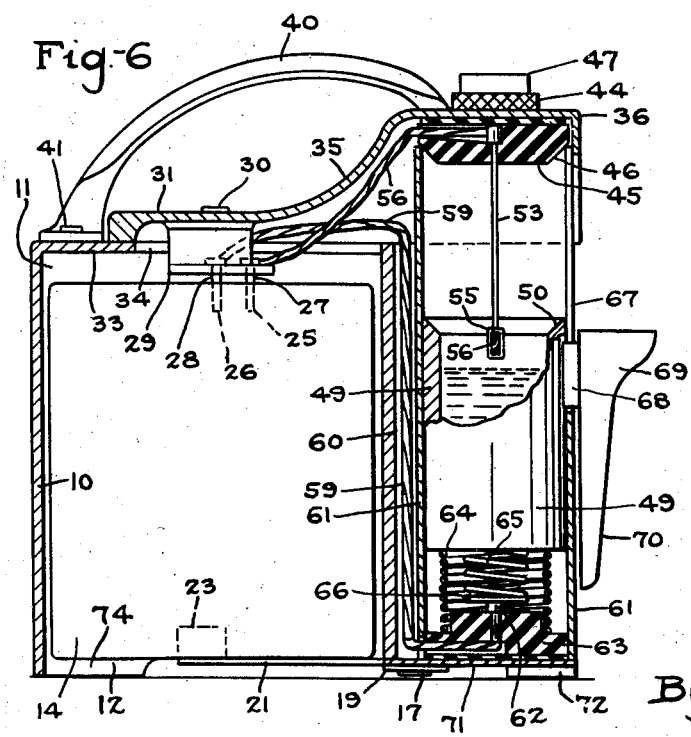
Fig. 6 is a similar elevation view with the parts in a different position.
Figure 8:
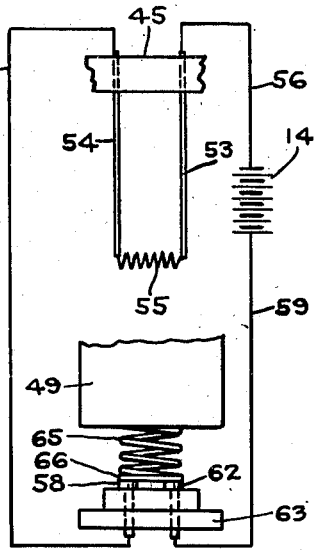
Fig. 8 is a wiring diagram.

As illustrated, a main casing 10 may be formed of cast metal, sheet metal, Bakelite, or the like and provides a rectangular chamber 11 adapted to receive through the full-sized opening 12 in the bottom of the casing 10, Figs. 5 and 6, a dry cell battery 14 of standard construction and of a size and shape conveniently adapted to be received in the chamber 11. Lever members 15 and 16 are pivoted at 17 and 18 to ears 19 and 20 extended outwardly from the opening 12 from the bottom of the casing member, as best shown in Figs. 1 and 7. The levers 15 and 16 are provided with wing plates 21 and 22, Fig. 7 and in dotted lines in Fig. 1, and with stops 23 and 24. When swung outwardly this assemblage opens up the bottom of the chamber 11 to permit the introduction of the dry cell battery 14 and when swung into the closed position of Fig. 1, the wings 21 and 22 underlie the dry cell battery 14 and hold it in position within chamber 11. The dry cell 14 is provided with apertures indicated in dotted lines at 25 and 26 of Figs. 5 and 6. These apertures receive contact posts 27 and 28 carried by an insulating bracket 29, Figs. 5 and 6.

As shown, the member 29 is secured by means of screws 30 to the underside of a plate 31, Figs. 1 and 5, which is secured by means of screws 32 on the top 33 of the casing 10, there being an opening 34 in said top, as clearly shown in Figs. 3 and 5, through which the insulating bracket 29 extends. The plate 31 is provided with a raised portion 35 formed into a circular cap portion 36, and the sides of the raised portion 35 are secured by screws 37 to wing members 38 and 39 formed as part of the casing 10, as clearly shown in Fig. 1. Beneath cap 36 a handle member 40 is secured by screws 41 and bears at 42 upon the raised portion 35 of the plate 31. Obviously all the above described casing parts, including the plate 31 and its extended and connected ports and the handle 40, may be made of a single casting or plastic construction integrally united. Secured to cap portion 36 by means of a tubular member 43 and threaded bolts 44 is an insulating member 45 provided with beveled or conical face 46. A screw plug 47 closes the top of the opening 48 through the tubular member 43 to permit the introduction of incense liquid into the incense receptacle 49. This receptacle has thick walls with beveled upper edges 50 which are held against the beveled faces 46 of insulating member 45 by means of a strong compression spring 51. Carried by the insulating member 45 are a pair of posts 53 and 54 which are connected at their lower ends by a resistance wire 55. The post 53 is in circuit with dry cell battery 14 through a wire 56 and this circuit is continued through the resistance wire 55, post 54 and a wire 57 connected therewith to a contact 58. The battery wire 59 goes down through a channel 60 to the bottom of a cylinder 61 in which the container 49 is adapted to move vertically, and wire 59 connects with a contact 62 spaced from contact 58, as clearly shown in Figs. 2 and 4. The contacts 58 and 62 are supported by insulating blocks 63 within cylinder 61, as clearly shown in Figs. 2 and 6. A spring 51 rests upon insulating block 63, as shown, and constantly urges the receptacle 49 containing incense liquid against the insulating block 45 the beveled faces 50 and 46 of which are brought into sealing contact, as clearly shown in Fig. 5. The receptacle 49 is of insulating material, such as Bakelite, and it has connected to its bottom 64 a compression spring 65 which carries a metallic contact plate 66. The cylinder 61 is provided with an elongated slot 67. Through the slot 67 extends a projection 68 from a finger piece or handle 69 which is secured through the projection 68 to the incense liquid container 49, as clearly shown in Figs. 5 and 6. The handle 69 is provided with an elongated depending finger 70 which, as clearly shown, overlies the slot 67 when the receptacle 49 and handle 69 are held in their upper position by means of the spring 51.

The bottom of cylinder 61 is supported upon a plate 71 shown in detail from its under side in Fig. 7, which plate is secured to or forms an extension of the casing 10, as shown in Figs. 5 and 6. Rubber buttons 72, 73 and 74 on the underside of plate 71 give a three-point support to the front of the casing to permit pushing down the handle 69 and attached incense container 49 when it is desired to operate the apparatus.

From the above description it will be apparent that when the parts are in normal or inoperative position, as in Fig. 5, the resistance wire 55 (which may be supported upon a mica strip 56) is held immersed in the incense liquid within container 49, as clearly indicated in Figs. 2 and 5. In this position the electric circuit running through the resistance wire is broken by the space between contacts 58 and 62. When it is desired to operate the apparatus to give incense vapor, it is only necessary to push down on the handle 69. This will compress the spring 51 as the receptacle 49 descends until first the resistance wire 55 comes out of the liquid within the receptacle and of course is covered with a film of said liquid, and then the contact plate 66 is brought into engagement with the contacts 58 and 62. This closes the circuit through to the battery with the result that current flows from the battery through the resistance wire and causes it to heat which in turn vaporizes the film of liquid on the wire. This vapor tends to escape through the slot 67 in the front of the cylinder 61. When the pressure on the handle 69 is relaxed spring 51 will restore the parts to the normal position of Fig. 5 and in doing so the container 49 acts as a piston to force out through slot 67 all of the incense vapor which has been formed by heating the resistance wire 55. This, of course, causes the resistance wire again to be immersed in the incense liquid. The operation therefore can be repeated as often as may be desired.

I claim:

1. An incense vaporizer adapted to be operated at any point in a room, comprising a casing formed to provide a battery-receiving chamber open at the bottom thereof, a pair of spaced contact posts projecting into said chamber and a dry cell battery arranged in the latter and removable therefrom through said open bottom and having its terminals in engagement with said contact posts, a receptacle having an incense liquid-receiving space movably carried by said casing, conducting means including a heating element normally within said space adapted to be immersed in any liquid therein and connected to one of the posts of said pair, a conducting element carried by the receptacle, a second pair of spaced contact posts one connected to said conducting means and the other connected to the remaining post of the first mentioned pair, the receptacle being movable from its normal position enclosing said heating element within said space to a second position in which the conducting element completes the circuit from the battery through said contact posts and heater and wherein the heater is disposed outside of said liquid-receiving space, and controllable means for moving the receptacle to bring the heater out of said space and to complete said circuit.

2. An incense vaporizer adapted to be operated at any point in a room, comprising a casing formed to provide a substantially rectangular battery-receiving chamber open at the bottom thereof, a pair of spaced contact posts projecting into said chamber and a dry cell battery arranged in the latter and removable therefrom through said open bottom and having its terminals in engagement with said contact posts, a cylindrical member secured in a vertical position to one side of the casing, said member forming a vertical cylindrical chamber with a slot in one side thereof, a receptacle having an incense liquid-receiving space held for vertical movements in said cylindrical chamber, conducting means including a heating element normally within said space, said heating element adapted to be immersed in any liquid therein and connected to one of the posts of said pair, a conducting element carried by the receptacle, a second pair of spaced contact posts, one connected to said conducting means and the other connected to the remaining post of the first-mentioned pair, spring means supporting the receptacle and a thumb piece extending through the slot whereby the receptacle may be moved from its normal position enclosing said heating element within said space to a second position in which the conducting element completes the circuit from the battery through said contact posts and heater and the heater is disposed outside of said liquid-receiving space.

KARL F. RIESE.